Figure 1:
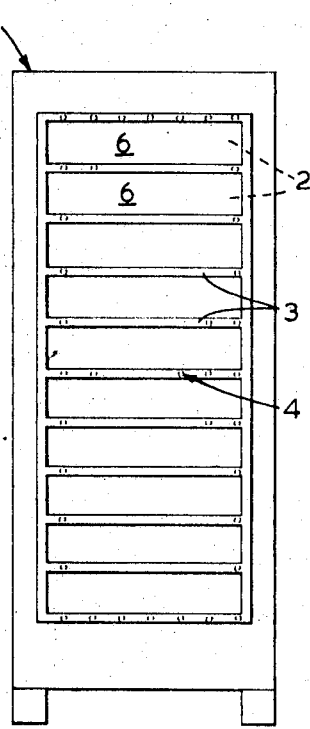

United States Patent [19]

Schneider

[11] 3,752,640
[45] Aug. 14, 1973

[54] BAKING BATTERY
[76] Inventor: Frank Schneider, 309 Wellington St., Sault Sainte Marie, Ontario, Canada
[22] Filed: July 9, 1971
[21] Appl. No.: 161,065

[30] Foreign Application Priority Data
July 9, 1970 Canada .............................. 087,771

[52] U.S. Cl. .................... 432/56, 126/339, 219/428
[51] Int. Cl. ............................................. A21b 3/00
[58] Field of Search .................... 107/55 R, 65, 56; 219/392, 394, 314, 428, 475; 432/56; 126/337, 337 A, 339, 340

[56] References Cited
UNITED STATES PATENTS
1,135,172   4/1915   Gantvoort ............................ 107/56
941,780   11/1909   Hoepfl ................................. 107/65
1,712,031   5/1929   Diemer .............................. 107/56 X FOREIGN PATENTS OR APPLICATIONS
364,741   10/1962   Switzerland ......................... 107/65

Primary Examiner—John J. Camby
Attorney—Cushman, Darby & Cushman

[57] ABSTRACT

The invention relates to a battery of substantially closed and insulated baking ovens each having a normally closed hinged door which is hinged inwardly when a wheeled rack is located adjacent the battery and the baking trays on the rack are pushed into engagement with the doors and into the ovens.

2 Claims, 5 Drawing Figures

Patented Aug. 14, 1973

3,752,640

3 Sheets-Sheet 1

Patented Aug. 14, 1973  3,752,640

3 Sheets-Sheet 2

BAKING BATTERY

This invention relates to baking batteries and racks and has for its object to provide a compact baking battery combined with a rack which is suitable for use in supermarkets.

Storage and display space in supermarkets is usually at a premium and this is particularly true where the commodity has been baked such as, for example, in the case of bread and rolls. It is the usual practice for bread and rolls to be baked and wrapped at a local bakery and then delivered to the supermarket. The staff of the supermarket must then stock the bread and rolls on the display shelves. Normally, these goods are quick-selling items inasmuch as they form part of the staple diet. The daily turnover, therefore, means that the shelves must be constantly restocked throughout the day.

It is contemplated that the combined baking battery and rack, forming the subject of the present invention, is capable of being installed in a supermarket where the actual baking can be observed by the customers who will, in consequence, be assured that the goods are freshly baked. Moreover, the present invention contemplates the use of wheeled racks which are used both in the baking operation as well as for storage after baking and which, in so doing, will release the display shelves normally used in the supermarkets for storing baked products for other purposes.

According to one broad aspect, the present invention relates to a plurality of vertically stacked substantially closed ovens each containing heating means and each having a normally closed door hingeable about a horizontal axis; a wheeled rack for supporting a plurality of baking trays; said rack having means which, when an operator urges the rack towards the ovens, contacts the doors and swings them inwardly of the ovens to permit the insertion and extraction of the trays into and from the ovens, each said door automatically returning to its normally closed position upon withdrawal of the rack away from the ovens.

According to another broad aspect, the present invention relates to a battery of baking ovens and a wheeled rack, said battery including a plurality of vertically stacked ovens each having a floor, a ceiling, a pair of mutually opposed side walls and a rear wall, all of said walls being insulated; the floor of each oven, with the exception of the lowermost oven, also serving as the ceiling of the next adjacent and lower oven; at least one heating element located substantially within the floor of each oven and in the ceiling of the uppermost oven; a steam-intake communicating with all of said ovens; members within each said oven for supporting a baking tray; and a normally closed door, hingeable about a horizontal axis, for each oven to permit the insertion and extraction of a said tray; said wheeled rack serving to transport the trays to and from the battery and having cam means for contacting the doors to swing them inwardly of the ovens to permit the insertion and extraction of said trays into and from the ovens, each said door automatically returning to its normally closed position upon withdrawal of the rack away from the ovens.

Figure 2:
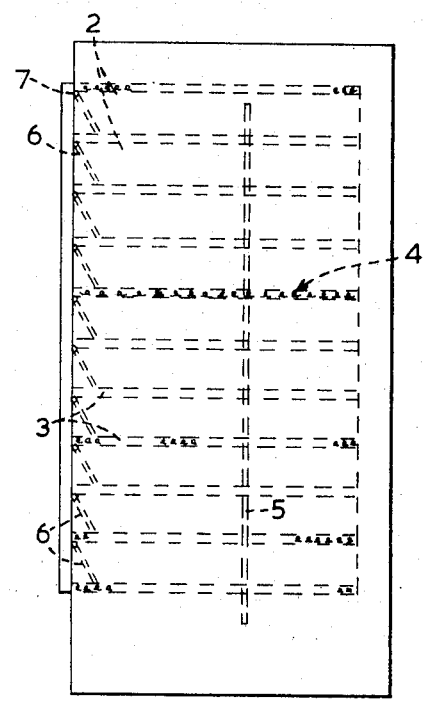
Figure 3:
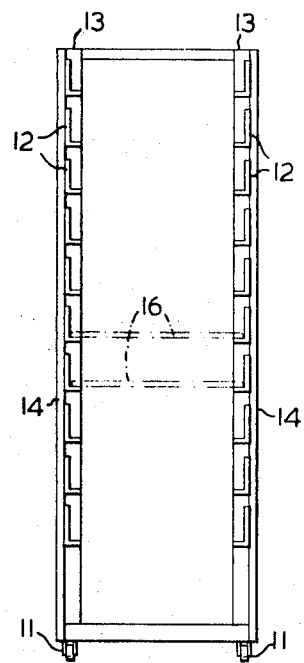
Figure 4:
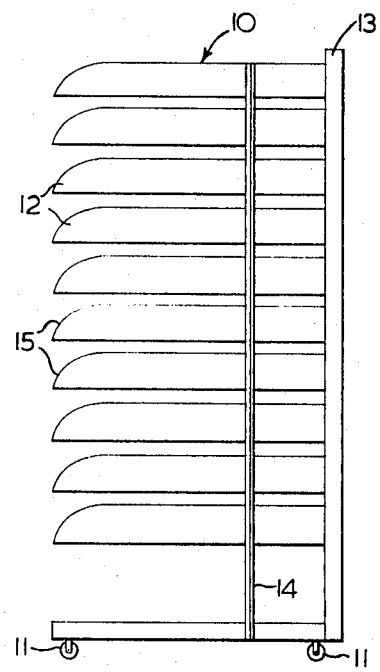
Figure 5:
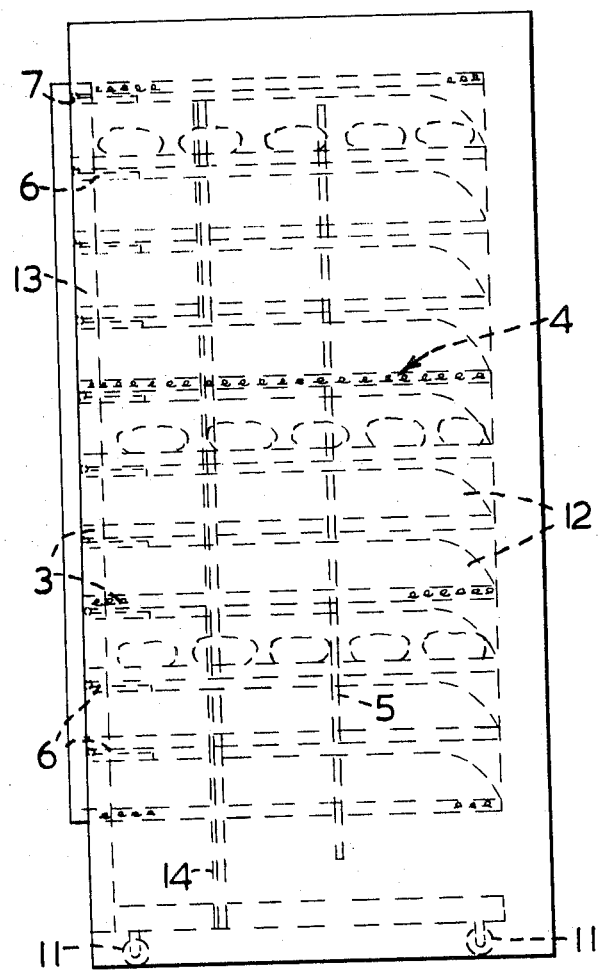

The invention is illustrated in the accompanying drawings in which:

FIG. 1 is a front elevation of a battery of ovens;
FIG. 2 is a side view of FIG. 1;
FIG. 3 is a front elevation of a baking rack;
FIG. 4 is a side elevation of FIG. 3; and
FIG. 5 is a side elevation of a battery of ovens of the type shown in FIGS. 1 and 2 combined with a baking rack of the type shown in FIGS. 3 and 4.

Referring to the drawings, and in particular to FIGS. 1 and 2, a baking battery, indicated generally at 1, consists of a number of vertically stacked substantially closed and insulated ovens 2. The floor 3 of each oven, with the exception of the lowermost oven, also serves as the ceiling of the next adjacent and lower oven. Each said floor 3 contains at least one electric heating element, indicated generally at 4, and connected to any suitable source of supply. A steam intake 5, (see FIG. 1) is connected to all of the ovens. Each oven 2 has its own door 6, hinged at 7 about a horizontal axis so that it can be urged into the oven.

A rack 10 (see FIGS. 3 and 4) is provided with casters 11 and pairs of vertically and horizontally spaced angled side members 12 supported by a frame 13 and a pair of angled side-braces 14. The forward end of each side member 12 is curved, as at 15 in FIG. 4.

Each horizontal pair of side members 12 serves as the support for a removable baking tray 16 (see FIG. 3) on which the products requiring baking are placed.

In operation, and after the trays 16 with the unbaked products have been placed on the rack 10, the latter is wheeled to a position where the cammed or curved forward ends 15 of each horizontally spaced pair of side members 12 contacts a door 6 of an associated oven 2. The baker then continues to push the rack so that the cammed ends 15 of members 12 will hinge the oven doors upwardly and inwardly (see FIG. 5) whereupon he then slides the trays into the ovens and withdraws the rack, the doors automatically returning to their closed position.

When the required baking period has elapsed, the baker again "marries" the rack with the ovens so that the trays, together with the baked products, can be withdrawn from the oven and placed on the rack. The latter is then wheeled away to a position where it serves as a combined storage and display rack.

With such a battery of ovens, combined with the rack, production rates are increased. For example, with the type of combination shown in FIG. 5, 120 dozen rolls can be baked in 1 hour.

Naturally, there are no delivery costs involved such as at present, from the bakery to the supermarket inasmuch as everything is baked on the spot in the supermarket and in full view of the customers. Moreover, and as has been described above, inasmuch as the racks serve to transport the trays to and from the ovens, they then serve as display racks after the products have been baked. Shelf-space heretofore used in the supermarket for baked products will thus be released for other commodities.

If desired, the supermarket can include a freezer for controlling the fermentation of the dough or mix prior to initiation of the baking process.

I claim:

1. In combination, a baking battery and a wheeled baking tray rack for use therewith said baking battery comprising a vertically stacked array of separate ovens; a door hingeably mounted on the top of each oven of said battery and biased to a closed position;

said baking tray rack comprising a plurality of vertically spaced pairs of side members, each pair thereof having horizontally, inwardly extending flanges to support a baking tray, the vertical spacing of side members being equal to the spacing of the stacked array of ovens in said battery;

and a curved camming surface on the forward end of each side member adapted, when said rack is moved into engagement with said battery to contact the oven doors to swing them inwardly and upwardly to permit the insertion and extraction of the rack and trays into and from the ovens.

2. The combination of claim 1 including steam heating means in the upper and lower surfaces of each of said separate ovens in said battery.

* * * * *